United States Patent [19]

Vaughan

[11] Patent Number: 4,973,461
[45] Date of Patent: * Nov. 27, 1990

[54] CRYSTALLINE ZEOLITE COMPOSITION

[75] Inventor: David E. Vaughan, Flemington, N.J.

[73] Assignee: Exxon Research & Engineering Company, Florham Park, N.J.

[*] Notice: The portion of the term of this patent subsequent to Nov. 12, 2002 has been disclaimed.

[21] Appl. No.: 163,739

[22] Filed: Mar. 3, 1988

Related U.S. Application Data

[60] Continuation of Ser. No. 11,376, Feb. 5, 1987, abandoned, which is a continuation of Ser. No. 749,512, Jun. 27, 1985, abandoned, which is a division of Ser. No. 550,897, Nov. 10, 1983, Pat. No. 4,552,731.

[51] Int. Cl.$^5$ .............................................. C01B 33/28
[52] U.S. Cl. ................................... 423/328; 423/329; 502/64; 502/65; 502/66
[58] Field of Search ....................... 423/328, 329, 330; 502/60, 64, 65, 66

[56] References Cited

U.S. PATENT DOCUMENTS

| | | | |
|---|---|---|---|
| 3,216,789 | 11/1965 | Breck et al. | 423/328 |
| 3,298,780 | 1/1967 | Fleck | 502/60 |
| 4,018,870 | 4/1977 | Whittam | 423/329 |
| 4,544,539 | 10/1985 | Wortel | 423/328 |
| 4,552,731 | 11/1985 | Vaughan | 423/328 |

FOREIGN PATENT DOCUMENTS 1393365 5/1975 United Kingdom.
1394163 5/1975 United Kingdom.

Primary Examiner—John Doll
Assistant Examiner—R. Bruce Breneman
Attorney, Agent, or Firm—Ronald D. Hantman

[57] ABSTRACT

A synthetic crystalline zeolite is provided characterized by having a composition, in terms of mole ratios of oxides, in the range:

$$0.9 \text{ to } 1.1 \text{ M}_{2/n}\text{O}:\text{Al}_2\text{O}_3:2.5 \text{ to } 5.1 \text{ SiO}_2:x\text{H}_2\text{O}$$

wherein M is at least one exchangeable cation, n is the valence of M, and x is 0 to 6, and characterized by having a specified x-ray powder diffraction pattern. The zeolite may be prepared by crystallization from a reaction mixture of KOH (and optionally a minor amount of NaOH), water, a source of silica, and a source of alumina preferably derived from kaolin or halloysite. Most preferably, the source of alumina is metakaolin and the source of silica is potassium silicate.

2 Claims, 1 Drawing Sheet

CRYSTALLINE ZEOLITE COMPOSITION

This is a continuation of application Ser. No. 011,376, filed Feb. 5, 1987, now abandoned, which in turn is a continuation of application Ser. No. 749,512, filed Jun. 27, 1985, now abandoned, which in turn is a divisional of application Ser. No. 550,897, filed Nov. 10, 1983, now U.S. Pat. No. 4,552,731.

BACKGROUND OF THE INVENTION

This invention relates to a novel zeolite and to a novel process for its preparation. In particular, the zeolite has a structure which may be stoichiometric quantities such that the ratio of product to reactants approaches unity.

A zeolite designated as zeolite L is known to exhibit good catalytic properties, particularly for hydrocarbon conversion, and advantageous sorbent properties as described, for example, by Barrer et al., *Surface Science*, 12, 341 (1968). The chemical composition of zeolite L is disclosed in U.S. Pat. No. 3,216,789 to be:

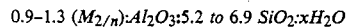

0.9–1.3 $(M_{2/n})$:$Al_2O_3$:5.2 to 6.9 $SiO_2$:$xH_2O$ where M is an exchangeable cation of valence n and x is from 0 to 9. Zeolite L also has a characteristic x-ray diffraction pattern, and its structure has been determined by Barrer et al., *Zeit. Krist.*, 128, 352 (1969). The x-ray diffraction pattern of zeolite L has the following more significant d(Å) values:

16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

A typical preparation of Zeolite L as disclosed by Breck, *Zeolite Molecular Sieves*, New York: J. Wiley, 283 (1974), employs an excess of $SiO_2$ and a greater excess of $K_2O$.

The preparation of zeolite L described in U.S. Pat. No. 3,216,789 involves crystallizing the zeolite from a reaction mixture having a mole ratio of silica to alumina which is significantly higher than the ratio in the formed zeolite. Specifically, the reaction mixture comprises mole ratios:

| $K_2O/(K_2O + Na_2O)$ | 0.33–1 |
|---|---|
| $(K_2O + Na_2O)/SiO_2$ | 0.35–0.5 |
| $SiO_2/Al_2O_3$ | 10–28 |
| $H_2O/(K_2O + Na_2O)$ | 15–41 |

Zeolite L and zeolites having related structures belong to the "L" family of zeolites. This family is characterized by having a 12-ring hexagonal structure with pore dimensions of about 5.5 to 7.2 Å. In addition to zeolite L there are also barium zeolites Ba-G and Ba-G,L described by Barrer et al. in *J. Chem. Soc.*, 2296 (1964), *J. Chem. Soc.*, 1254 (1972) and *J. Chem. Soc.*, 934 (1974); Linde omega disclosed in U.S. Pat. No. 4,241,036; zeolite ZSM-4 disclosed in U.K. Patent No. 1,117,568; and the mineral mazzite which occurs in nature (see Galli et al., *Contrib. Mineral and Petrologie*, 45, 99 (1974)). ZSM-10 (U.S. Pat. No. 3,692,470) may be a Dabco containing member of this group of zeolites. Similarly, zeolite UJ (U.S. Pat. No. 3,298,780) may also be of the zeolite L type.

Structures have been proposed for zeolite L (Barrer et al., *Zeit. Krist.*, 128, 352 (1969)), Linde omega (Barrer et al., *Chem. Comm.*, 659 (1969)), and mazzite (Galli, *Crystal. Str. Comm.*, 339 (1974)). Galli et al., *Contrib. Min. & Petr.*, 45, 99 (1974) have compared the data for zeolite L, omega and mazzite. Meier et al., *Atlas of Zeolite Structures* (1978) propose that mazzite, ZSM-4 and omega are isostructural, differing only in Si/Al ratios and cation contents. If all cation positions in L are filled by monovalent cations, L will have a minimum Si/Al ratio of 1.8 according to Baerlocher et al., *Zeit. Krist.*, 136, 253 (1972).

British Patent No. 1,202,511 describes a revised zeolite L preparation using lower proportions of silica in the reaction mixture which comprises mole ratios of reactants as follows:

| $K_2O/(K_2O + Na_2O)$ | 0.7–1 |
|---|---|
| $(K_2O + Na_2O)/SiO_2$ | 0.23–0.35 |
| $SiO_2/Al_2O_3$ | 6.7–9.5 |
| $H_2O/(K_2O + Na_2O)$ | 10.5–50 |

The ratio $H_2O/(K_2O+Na_2O+SiO_2+Al_2O_3)$ is preferably not greater than 6 to give a "dry gel" as product. The source of silica employed is a solid, amorphous silica.

U.S. Pat. No. 3,867,512 discloses a preparation of zeolite L from a reaction mixture having a molar composition:

| $K_2O/(K_2O + Na_2O)$ | 0.3–1 |
|---|---|
| $(K_2O + Na_2O)/SiO_2$ | 0.3–0.6 |
| $SiO_2/Al_2O_3$ | 10–40 |
| $H_2O/(K_2O + Na_2O)$ | 15–140 | in which the silica source is a gel having at least 4.5 weight percent water and prepared in a particular manner.

L. Wilkosz in *Pr Chem* 409 (1974) -*Chemical Abstracts*, 90 (1979) 573478 describes the preparation of zeolite L from a synthesis sol prepared by treating a solution containing silica, potassium hydroxide and sodium hydroxide with a second solution containing potassium aluminate, potassium hydroxide and sodium hydroxide and crystallizing for 72 hours at 20° C. and 122 hours at 100° C. The zeolite L product has a $SiO_2$:$Al_2O_3$ ratio of 6.4:1, derived from input stoichiometries having $SiO_2/Al_2O_3$ ratios between 15 and 30.

G. V. Tsitsishvilli et al. in *Doklady Akademii NaikSSSR*, 243, 438–440 (1978) describe the synthesis of zeolite L from alumina-silica gels containing tributylamine. The gels used had the following molar ratios:

| $SiO_2$:$Al_2O_3$ | 25 |
|---|---|
| $(K_2O + Na_2O)$:$Al_2O_3$ | 18 |
| $(K_2O + Na_2O)/SiO_2$ | 0.72 |
| $H_2O/(K_2O + Na_2O)$ | 20 |

-continued

| | |
|---|---|
| K₂O:Na₂O | 0.5 |

Y. Nishiimura in *Nippon Kagaku Zasshi*, 91, 1046-9 (1970) describes in general terms zeolite L preparation from a synthesis mixture containing colloidal silica, potassium aluminate and potassium hydroxide having a $SiO_2:Al_2O_3$ ratio of 15-25, but exemplifies only two synthesis mixtures having the following ratios of components:

$7K_2O:Al_2O_3:20SiO_2:450H_2O$; and
$8K_2O:Al_2O_3:10SiO_2:500H_2O$.

U.S. Pat. No. 3,298,780 describes zeolite UJ having a composition, expressed as mole ratios of oxides, corresponding to $0.9\pm0.2R_{2/v}O:Al_2O_3:5.0\pm1.5SiO_2:wH_2O$ wherein R represents at least one cation having a valence of not more than 4, v represents the valence of R and w can be any value up to about 5, said zeolite having an X-ray powder diffraction pattern essentially as shown in the following table:

| Interplanar spacing, d(Å) | Relative Intensity |
|---|---|
| 16.25 ± 0.25 | VS |
| 7.55 ± 0.15 | M |
| 6.50 ± 0.10 | M |
| 5.91 ± 0.10 | W |
| 4.61 ± 0.05 | S |
| 3.93 ± 0.05 | S |
| 3.67 ± 0.05 | W |
| 3.49 ± 0.05 | M |
| 3.29 ± 0.05 | W |
| 3.19 ± 0.05 | M |
| 3.07 ± 0.05 | M |
| 2.92 ± 0.05 | M |
| 2.66 ± 0.05 | W | prepared by a process comprising preparing an aqueous reactant solution having a composition, expressed as mole ratios of oxides, corresponding to

| |
|---|
| $SiO_2/Al_2O_3$ of from 6 to 30, |
| $R_{2/v}O/SiO_2$ of from 0.30 to 0.70, and |
| $H_2O/R_{2/v}O$ of from 80 to 140; | and maintaining said reactant solution at a temperature between 150° F. (65.6° C.) and 325° F. (162.8° C.) until the zeolite crystals are formed. Zeolite UJ is described as having nearly cubic shaped crystals with a crystal size ranging upward from 0.05 micron.

GB No. 1,393,365 describes zeolite AG1, related to zeolite L, having the molar composition other than water:

$1.05\pm0.3M_2O:Al_2O_3:4.0-7.5SiO_2$ wherein M is potassium or a mixture of potassium and sodium, a characteristic x-ray powder diffraction pattern, and being capable of adsorbing at least 3% w/w perfluorotributylamine. As the zeolite L pore structure is too small to allow penetration by this molecule, zeolite AG-1 cannot be a highly pure zeolite L.

It was subsequently found that zeolite L may be used as a catalyst base in aromatization reactions. U.S. Pat. No. 4,104,320 discloses dehydrocyclization of aliphatic compounds in the presence of hydrogen using a catalyst comprising zeolite L and a group VIII metal, in which the zeolite L is of the formula:

$M_{9/n}(AlO_2)_9(SiO_2)_{27}$ (where M is a cation of valence n), but the silica to alumina ratio may vary from 5 to 7.

East German Patent No. 88,789 discloses dehydrocyclization using a catalyst formed from a zeolite precursor with a silica to alumina ratio of 5 or greater which is dealuminised to give a silica to alumina ratio of up to 70. Zeolite L is mentioned as a precursor.

European Patent Application Publication No. 40119 discloses a dehydrocyclization process operating at low pressure (1 to 7 bars) or low $H_2$/hydrocarbon ratio using a catalyst comprising platinum on a potassium zeolite L. Belg. Patent No. 888,365 describes dehydrocycliZation using a catalyst comprising platinum, rhenium (incorporated in the form of its carbonyl) and sulPhur to give an atomic ratio of sulphur to platinum of 0.05 to 0.6 on a zeolitic crystalline aluminosilicate base such as zeolite L. Belg. Patent No. 792,608 discloses the treatment of Zeolite L for use as a catalyst in isomerization by exchange with ammonium and chromium ions.

SUMMARY OF THE INVENTION

It has now been found that a new zeolitic material designated herein for convenience as ECR-2 has the X-ray diffraction pattern characteristic of zeolite L but has a lower $SiO_2:Al_2O_3$ ratio. This zeolite is useful as a catalyst base in hydrocarbon conversions such as aromatiZation. The chemical composition of ECR-2 may be stoichiometrically expressed in terms of mole ratios of oxides as follows:

$0.9$ to $1.1$ $M_{2/n}O:Al_2O_3:2.5$ to $5.1$ $SiO_2:xH_2O$ wherein M represents at least one exchangeable cation of a metal selected from Groups I-VIII of the Periodic Table, n represents the valence of M, and x may be 0 or a number from 1 to about 6. The Zeolite herein is also characterized by a hexagonal unit cell and by an x-ray diffraction pattern having the characteristic peaks given in Table IV hereinbelow.

The zeolite may be used as a sorbent or as a catalyst, e.g., as a hydrocarbon conversion catalyst for e.g., paraffin isomerization, aromatization and alkylation, or the cracking and hydrocracking of lube stocks, fuels and crude oils.

In another embodiment of this invention the above-identified Zeolite, where M is K or a mixture of K and Na (where Na is no more than 30 mole percent of the mixture) and n is 1, may be prepared by a convenient and efficient process wherein (a) a reaction mixture is prepared comprising water, a source of silica, a source of alumina, preferably metakaolin, KOH, and up to about 30% by moles of NaOH based on total weight of KOH and NaOH, said reaction mixture having a composition, in terms of mole ratios of oxides, within the following ranges:

| | |
|---|---|
| $M'_2O:Al_2O_3$ | 1.0 to 1.6 |
| $SiO_2:Al_2O_3$ | 2.5 to 5.1 |
| $H_2O:Al_2O_3$ | 80 to 140 | where M' is either K or a mixture of K and Na; and (b) the reaction mixture is maintained at between about 140 and 300° C. under autogenous pressure for a sufficient period of time to form crystals of the zeolite.

It will be understood that the compositions may contain some waters of hydration (the x value) which may be at least partially removed when the zeolites are employed as sorbents or catalysts. In addition, the K and optional Na in the original synthesized zeolite may be subsequently exchanged with elements from Groups I through VIII of the Periodic Table.

The process herein results in high reaction efficiencies because stoichiometric or nearly stoichiometric conversion of reactants to products occurs. As a result, undesirable effluents from the process such as excess silica and potassium oxide are minimized or eliminated.

DESCRIPTION OF THE PREFERRED EMBODIMENTS

Figure 1:
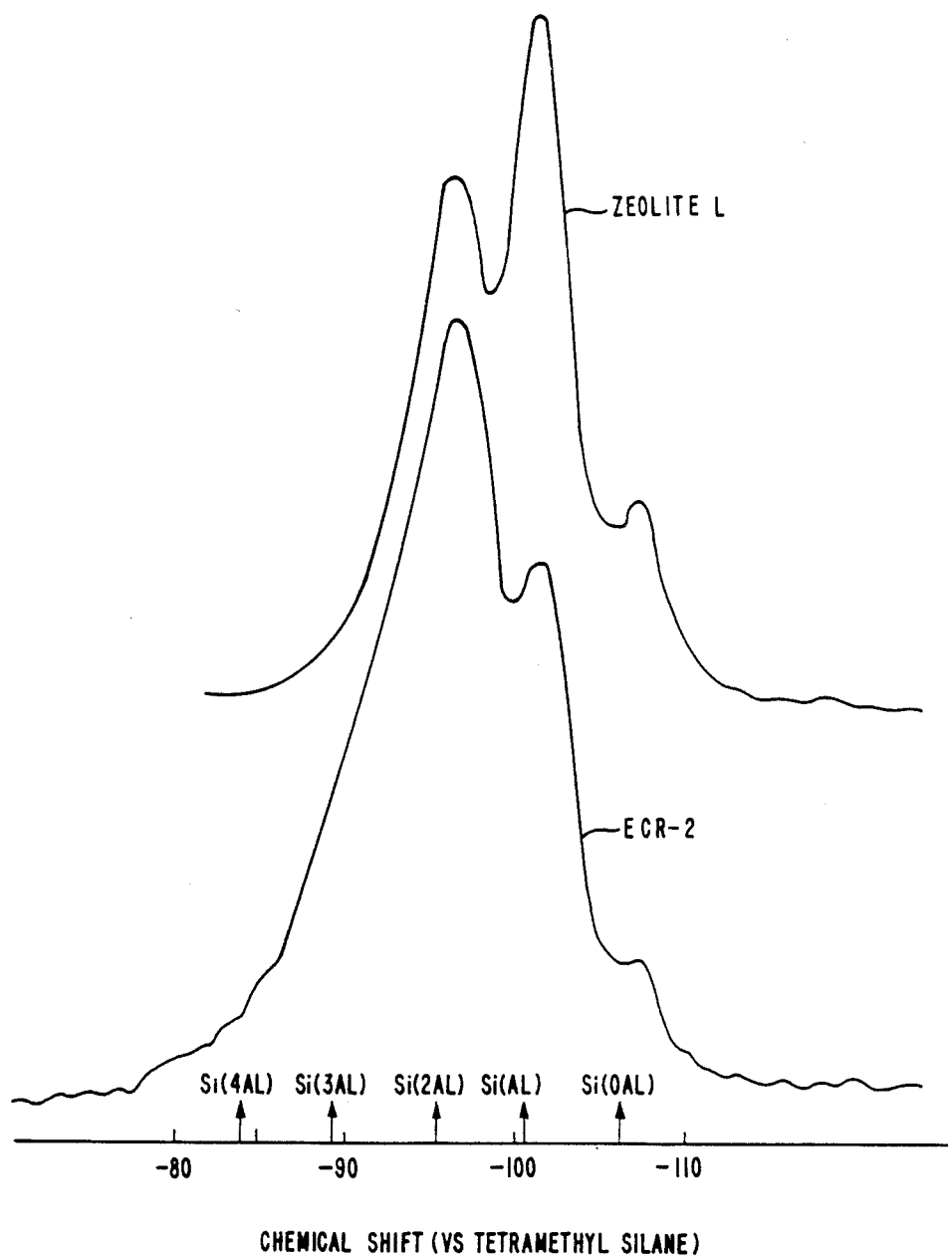
FIG. 1 illustrates the $^{29}$Si-MAS-NMR (magic angle spinning nuclear magnetic resonance) spectra for Zeolite L from Union Carbide (as comparison) and for a representative zeolite of this invention (Example 5).

The novel zeolite of this invention has a hexagonal unit cell as do members of the zeolite L family, but has a lower silica to alumina ratio than zeolite L, which has a ratio of 5.2 to 6.9 alumina to silica. A comparison of the properties of the various zeolites in the L family with those of the zeolite composition of this invention (ECR-2) is summarized in Table I for unit cell parameters and in Table II for chemical composition ranges.

TABLE I

| Zeolite | Unit Cell Parameters (Å) | | Reference |
|---|---|---|---|
| | a | c | |
| Zeolite L | 18.40 | 7.52 | Barrer et al., U.S. Pat. No. 3,216,789 |
| Ba-G,L | 18.70 | 7.59 | Barrer et al., 1972, supra |
| Mazzite | 18.39 | 7.65 | Galli et al., 1974, supra |
| Omega | 18.15 | 7.59 | Barrer et al., U.S. Pat. No. 4,241,036 |
| ZSM-4 | 18.40 | 7.60 | U.K. Pat. 1,117,568, supra |
| ECR-2 | 18.46 | 7.56 | Example 3, infra |
| ECR-2 | 18.49 | 7.52 | Example 5, infra |

TABLE II

| Zeolite | Silica/Alumina ratio | Cation Used for Preparation |
|---|---|---|
| Zeolite L | 5.2 to 6.9 | K,Na |
| Ba-G,L | 2.0 to 2.5 | Ba,K |
| Mazzite | 5.4 | K,Ca,Mg |
| Omega | 10 to 20 | Na, (CH$_3$)$_4$N |
| ZSM-4 | 3 to 20 | Na, (CH$_3$)$_4$N |
| ECR-2 | 2.5 to 5.1 | K,Na |

Conventionally, new zeolite phases have been characterized by both chemical composition and unique x-ray diffraction patterns. When structures are very similar, however, as in this family of zeolites, x-ray diffraction patterns tend to be very similar, and peak intensity relationships become important. A comparison of the x-ray data for ERC-2 of this invention, zeolite L and mazzite is therefore provided in Table III, using the data of Barrer et al., Zeit. Krist., supra and Galli et al., Contrib. Min. & Petr., supra, respectively, for the latter two zeolites.

TABLE III

Comparison of x-ray Diffraction Data for Mazzite, L and ERC-2

| h k l | Mazzite | | Zeolite L | | ERC-2 | |
|---|---|---|---|---|---|---|
| | I/I$_o$ | d$_{obs}$ (Å) | I/I$_o$ | d$_{obs}$ (Å) | I/I$_o$ | d$_{obs}$ (Å) |
| 100 | 35 | 15.93 | 100 | 15.80 | 100 | 15.89 |
| 110 | 60 | 9.20 | — | — | — | — |
| 200 | 35 | 7.96 | 14 | 7.89 | — | — |
| 001 | — | — | 15 | 7.49 | 20 | 7.49 |
| 101 | 25 | 6.89 | — | — | — | — |
| 210 | 53 | 6.02 | 25 | 5.98 | 30 | 6.01 |
| 111 | — | — | 11 | 5.75 | 17 | 5.81 |
| 201 | 12 | 5.53 | — | — | — | — |
| 300 | 17 | 5.31 | — | — | — | — |
| 211 | 50 | 4.729 | 32 | 4.57 | — | — |
| 220 | — | — | — | — | 54 | 4.59 |
| 310 | 12 | 4.423 | 13 | 4.39 | 15 | 4.40 |
| 301 | — | — | 13 | 4.33 | 9 | 4.33 |
| 400 | 20 | 3.986 | 30 | 3.91 | 72 | 3.92 |
| 311 | 95 | 3.824 | 13 | 3.78 | 6 | 3.81 |
| 002 | | | | | 2 | 3.78 |
| 102 | 25 | 3.717 | 19 | 3.66 | — | — |
| 320 | 47 | 3.655 | — | — | 31 | 3.655 |
| 112 | 90 | 3.531 | 23 | 3.48 | — | — |
| 410 | 12 | 3.474 | — | — | 60 | 3.476 |
| 202 | 10 | 3.452 | — | — | 4 | 3.397 |
| — | — | — | 14 | 3.26 | 34 | 3.283 |
| 500 | 100 | 3.185 | 34 | 3.17 | 72 | 3.182 |
| 302 | 30 | 3.102 | 22 | 3.07 | — | — |
| 330 | 38 | 3.065 | 15 | 3.02 | 46 | 3.065 |
| 420 | 40 | 3.010 | — | — | 9 | 3.008 |
| 501 | 100 | 2.941 | 23 | 2.91 | 53 | 2.908 |
| 222 | | | — | — | 7 | 2.838 |
| 510 | 10 | 2.865 | — | — | 6 | 2.793 |
| 511 | 12 | 2.681 | 19 | 2.65 | 46 | 2.655 |
| 322 | 16 | 2.643 | 8 | 2.62 | 20 | 2.620 |
| 520 | 20 | 2.552 | 8 | 2.53 | 13 | 2.503 |
| 601 | 5 | 2.511 | — | — | — | — |
| 502 | 1 | 2.446 | 9 | 2.45 | 11 | 2.471 |
| 203 | 9 | 2.422 | 11 | 2.42 | 16 | 2.425 |
| 521 | — | — | — | — | — | — |

These data clearly show that the x-ray diffraction pattern for ECR-2 is as different, or more so, from zeolite L and mazzite, as zeolite L and mazzite are from one another.

Table IV discloses the interplanar spacing and intensity of the most significant peaks in the x-ray diffraction pattern of ECR-2.

TABLE IV

| ECR-2 Diffraction Data | |
|---|---|
| Interplanar Spacing d(Å) | Intensity |
| 15.90 | v. strong |
| 7.50 | medium |
| 6.00 | medium |
| 4.60 | strong |
| 3.92 | v. strong |
| 3.66 | medium |
| 3.48 | strong |
| 3.28 | medium |
| 3.18 | v. strong |
| 3.07 | strong |
| 2.91 | strong |
| 2.65 | strong |

Chemical compositions have in the past been determined by bulk analysis of a specimen without differentiating between the composition of the crystalline phase and any extraneous material in the form of amorphous silica or alumina. In cubic zeolites it has been possible to relate changes in unit cell measurements of the crystalline phase to zeolite framework chemical composition (as, for instance, for faujasites as described by Breck and Flanigen, *Molecular Sieves,* 47 (1967)). In non-isotropic zeolites having more than one unit cell dimension, however, such correlations cannot be made without complete structural information. Recently, a new technique designated as 'Magic Angle Spinning Nuclear Magnetic Resonance' (MAS-NMR) has been developed to allow use of NMR to examine individual nuclei and their environments. Hence, using $^{29}$Si-MASNMR the different environments of silicon (i.e., Si surrounded by 4 Al atoms, 3Al+1Si, 2Al+2Si, 1Al+3Si, or 4Si atoms) can be detected. These are designated Si(4Al), Si(3Al), Si(2Al), Si(1Al) and Si(OAl). Each Si environment is represented by a particular peak, with the area of the peak representing the amount of Si in that environment. For example, by totalling the areas of the 1 to 5 peaks in the spectra of faujasite and zeolite A (zeolites which have only one silicon position) so a$ to obtain the average number of Al atoms surrounding each Si atom, it was possible to obtain the zeolite framework Si/Al ratio directly from the spectra (see Melchior et al., *J. Amer. Chem. Soc.,* 104, 4859 (1982) and *Nature,* 298, 455 (1982)). In zeolites that have more than one crystallographically unique Si position (e.g., zeolite L has two unique Si positions), there will be five possible peaks for each unique Si position. However, such multipeak spectra may not be sufficiently resolved to separate this number of peaks. In the case of zeolite L the two peaks representing $Si_1(2\ Al)$ and $Si_2(2\ Al)$ overlap and are represented by one broad peak, and likewise for the other peaks for $Si_1(1\ Al)$, $Si_2(Al)$, $Si_2(OAl)$, $Si_2(OAl)$, etc.

As shown in FIG. 1 a good correlation can be similarly obtained between the framework composition (from $^{29}$Si-MAS-NMR) and the chemical composition of Linde L. a zeolite L from Union Carbide with a silica to alumina ratio of 5.7. This spectrum can be compared with a similar spectrum for a representative zeolite composition of this invention (ECR-2 of Example 5), also provided in FIG. 1. The latter spectrum clearly shows that Si has more surrounding Al atoms (i.e., a lower Si/Al ratio) in ECR-2 than in zeolite L, confirming that the higher Al content of the ECR-2 composition is in framework sites. MAS-NMR data, therefore, confirms the chemical analysis data showing ECR-2 to have a composition outside that of zeolite L. A detailed analysis of the spectra in FIG. 1 is provided in Table V.

TABLE V

| | Analytical Derivation of $SiO_2/Al_2O_3$ Molar Ratio from $^{29}$Si-MAS-NMR Spectra | | | | | | |
|---|---|---|---|---|---|---|---|
| | $SiO_2/Al_2O_3$ Molar Ratio | | Relative Area of Si (xAl) peak | | | | |
| Zeolite | Chemical Analysis | NMR Analysis | x = 4 | 3 | 2 | 1 | 0 |
| L | 5.70 | 5.84 | 0.0 | 0.04 | 0.41 | 0.45 | 0.11 |
| Ex. 5 | 3.76 | 3.96 | 0.05 | 0.20 | 0.51 | 0.20 | 0.04 |

Minor variations in the mole ratios of the oxides within the ranges given in the chemical composition for ECR-2 do not substantially alter the structure or Properties of the zeolite. In addition, the number of waters of hydration x in the formula will not be the same for each preparation and will depend on the silica to alumina ratio, the type of exchangeable cation employed, and the degree to which the zeolite is dried.

The cations which may be exchanged with those of the zeolite may be cations of metals from any one of Groups I to VIII of the Periodic Table. Preferably the cations will be mono-, di- and trivalent metal cations, particularly from Groups I, II or III of the Periodic Table such as barium, calcium, cerium, lithium, magnesium, potassium, sodium, strontium, zinc, and the like, or hydrogen or ammonium or alkylammonium ions. These exchangeable cations will generally not cause a substantial alteration of the basic crystal structure of the zeolite. Particularly preferred are mono- and divalent cations, as they are more easily included in the pores of the zeolite crystal.

A particularly preferred zeolite herein for use catalytically or as a sorbent has a composition in the range:

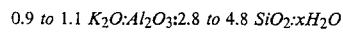

$$0.9\ to\ 1.1\ K_2O\text{:}Al_2O_3\text{:}2.8\ to\ 4.8\ SiO_2\text{:}xH_2O$$

where x is 0 to 6, preferably 0. This compound is preferred because it does not contain any of the impurity zeolite UJ having a silica to alumina ratio of about 5.

While numerous types of cations may be present in the zeolite, the preferred preparation method herein is the synthesis of the predominantly potassium form of the zeolite because the reactants are conveniently available and are generally water soluble and also because the preferred method of synthesis for a stoichiometric conversion to the product employs potassium as the predominant cation as described below. The potassium (and optionally sodium) cations can subsequently be exchanged, if desired, for other cations using, for example, conventional ion exchange techniques as discussed, for example, in U.S. Pat. No. 3,216,789. Excessive levels of sodium are undesirable in this synthesis as they promote the formation of impurity phases.

In an efficient method for preparing the novel zeolite composition represented by this invention a reaction mixture is prepared, generally as a slurry or gel, comprised of potassium hydroxide, and optionally in conjunction with the potassium hydroxide up to about 30% by moles of sodium hydroxide, preferably no more than 20% NaOH, based on total combined moles of sodium and potassium hydroxide. Preferably the amount of sodium hydroxide is minimized because it promotes the formation of zeolite P and other impurities. In addition, the reaction mixture contains water, a source of alumina, and a source of reactive silica such as, e.g., silica gels, silicic acid, and aqueous colloidal silica sols as described, e.g., in U.S. Pat. No. 2,574,902, and potassium or sodium silicates. ECR-2 products are preferably prepared using potassium silicate. The alumina is preferably derived from kaolin or halloysite and is most preferably derived from metakaolin, which has a theoretical oxide formula of $Al_2O_3\text{:}2SiO_2$. Metakaolin is preferred in that it eliminates gellation problems that frequently promote impurity formation in systems having low amounts of excess base. The metakaolin may be obtained, for example, by heating kaolin or halloysite clay, having an oxide formula of $Al_2O_3\text{:}2SiO_2.xH_2O$ (x=1 or 2, respectively) at over about 600° C. for about two or more hours to remove the waters of hydration therefrom and to render the structure amorphous and reactive.

The amounts of ingredients in the reaction mixture will vary considerably depending, e.g., on the types of ingredients employed (e.g., the source of alumina and silica) and the particular composition ultimately desired. In general, however, the relative amounts of ingredients will be such that the reaction mixture will have a composition, in terms of mole ratios of oxides, within the following ranges:

| Oxide Constituents | Ranges of Mole Ratios |
|---|---|
| $M'_2O:Al_2O_3$ | 1.0 to 1.6 |
| $SiO_2:Al_2O_3$ | 2.5 to 5.1 |
| $H_2O:Al_2O_3$ | 80 to 140 | where M' is either potassium or a mixture of sodium and potassium (where sodium comprises up to 30 mole percent of the mixture) in the case where sodium hydroxide is employed. Preferably, the mole ratio of $H_2O$ to $Al_2O_3$ in the reaction mixture ranges from 90 to 120, and the mole ratio of $SiO_2$ to $Al_2O_3$ from 3 to 5, more preferably 3.5 to 5.

The order of mixture of ingredients is not essential, and all ingredients may be added simultaneously. The reaction mixture is ordinarily prepared in a container made of metal or glass or the like which should be closed to prevent water loss, or equipped so as to maintain constant water levels.

After the reaction mixture is formed it is placed in a reactor which can withstand elevated pressures such as an autoclave, where it is maintained at a temperature of between about 120° and 300° C., preferably 160° and 240° C. for commercial purposes, to induce crystallization. The exact temperature will depend, for example, on the amount of potassium hydroxide present and the length of time employed for reaction. At temperatures much above about 300° C. the zeolites obtained are not commercially acceptable due to the rapid crystallization of impurity phases which occurs, resulting in a poor quality product.

During crystallization the reaction mixture is preferably maintained in a substantially homogeneous state, i.e., in a state such that settling of solids is minimized, and preferably eliminated. For example, metakaolin tends to settle out of the reaction mixture if there is insufficient stirring. If the reaction mixture is not substantially homogeneous, the crystallized product ultimately obtained will comprise a mixture of products and will thus be impure. Homogeneity may be achieved by homogenization of the reaction mixture after it is formed by thorough blending until the desired degree of homogeneity is obtained. The mixing may take place in any vessel in which complete mixing can be effected such as in a blender or a reaction vessel equipped With an agitator.

Alternatively, the reaction mixture after its formation can be subjected immediately to the elevated reaction temperatures above prescribed, with slow stirring thereof (at a rate less than 60 rpm) to ensure substantial homogeneity. Stirring tends to promote formation of impurities such as phillipsite.

During heating of the substantially homogeneous reaction mixture, autogenous pressures are maintained which will depend on the temperature employed. For example, pressures of 3 atm may be adequate for temperatures at the lower range, but at high temperatures of e.g., 220° C. or more, pressures of up to about 20 atm or higher may be achieved. The amount of time required for heating will depend mainly on the temperature employed, so that at 160° C. the heating may be carried out, e.g., for up to 6 to 8 days, whereas at 250° C. the time period may be, e.g., 2 to 3 days. In any event, the heating is carried out until maximum amounts of crystals are formed of the ECR-2 zeolite product, having the following range of composition:

$$1.0 \text{ to } 1.1\ M'_2O:Al_2O_3:2.5 \text{ to } 5.1\ SiO_2:0 \text{ to } 6\ H_2O$$

where M' is as defined above. The product zeolite ECR-2 is also characterized by having a structure as indicated by an x-ray powder diffraction pattern which is essentially the same as that shown in Table III below. The crystallization time may be shortened by seeding the slurry to be crystallized with minor amounts of a source of nuclei (e.g., zeolite ECR-2 crystals of this invention). Preferably, before maintaining the reaction mixture at 80° to 160° C. a zeolite is added to the mixture in an amount of from 0.1 to 10% by weight based on silica and alumina, the zeolite having the composition of this invention. Nucleation may also be induced by aging the slurry or a portion of the slurry at about 10° to 100° C. for about 6 hours to 6 days prior to the crystallization at 140° to 300° C. The nucleation method described in copending U.S. appln. Ser. No. 550,890 (C-1483) to D. E. W. Vaughan filed of even date, entitled "Process for Preparing Type L Zeolites by Nucleation Technique" may also be employed to shorten crystallization times.

When the zeolite crystals have been obtained in sufficient amount they are recovered by filtration from the reaction mixture and are then washed, preferably with deionized or distilled water, to wash away excess mother liquor. The washing should continue, for best purity results, until the wash water, equilibrated with the product, has a pH of between about 9 and 12. After the washing step the zeolite crystals may be dried or calcined.

It is noted that increasing the crystallization temperature not only shortens crystallization time for a given composition slurry, but also increases the average crystal size of the product. This therefore provides an effective method for controlling the crystal size and optimising specific sorbents or catalysts.

The zeolite of this invention may be used as a sorbent or as a catalyst, e.g., in a hydrocarbon conversion process such as in paraffin isomerization, aromatization, reforming and alkylation, and in the cracking or hydrocracking of lube stocks, fuels and crude oils. To be employed for these applications, the zeolite may be at least partially dehydrated by drying at temperatures of up to about 500° C. or more until most or all of the water of hydration is removed.

The process described herein for preparation of ECR-2 represents an efficient and environmentally sound procedure for preparing the zeolite since there is little waste of the reactants employed.

The examples which follow illustrate the invention. In all examples, parts and percentages are given by weight and temperatures in degrees Centigrade unless otherwise noted.

EXAMPLE 1

A total of 73.4 g of metakaolin derived from commercially obtained kaolin was blended with 218.3 g of potassium silicate obtained commercially, 20.2 g of KOH (85% $K_2O$) and 488.2 g of water to form a slurry having a composition in terms of mole ratios of oxides as follows:

| | |
|---|---|
| $K_2O:Al_2O_3$ | 1.4 |
| $SiO_2:Al_2O_3$ | 5.1 |
| $H_2O:Al_2O_3$ | 110 |

After homogenizing this slurry in a blender set at medium speed for 10 minutes, the slurry was reacted in a stainless steel autoclave at 280° C. for 64 hours and then filtered. The product obtained on washing and drying the filtrate was a pure zeolite having the chemical composition:

1.01 $K_2O:Al_2O_3:4.76\ SiO_2$ an x-ray powder diffraction pattern indicated in Table VI, and comprising euhedral prisms 0.1 micron by 0.5 micron. The data in Table VI correlates with the data presented for comparison purposes in Table III and IV, except that the numbers in Table VI are not rounded off.

TABLE VI

Characteristic x-ray Diffraction Pattern for ECR-2

| Starting Angle: 5.0000 | Count Time: 1.0 |
|---|---|
| Ending Angle: 40.0000 | Lambda: 1.54051 |
| Angle Increment: 0.0200 | |

| PEAK | 2-THETA | D | RELINT |
|---|---|---|---|
| 1 | 5.5557 | 15.8833 | 100.00 |
| 2 | 11.7948 | 7.4866 | 20.48 |
| 3 | 14.7206 | 6.0125 | 30.86 |
| 4 | 15.2281 | 5.8133 | 17.13 |
| 5 | 19.3160 | 4.5912 | 54.47 |
| 6 | 20.1272 | 4.4080 | 14.86 |
| 7 | 20.4912 | 4.3305 | 8.90 |
| 8 | 22.6436 | 3.9235 | 71.77 |
| 9 | 23.3561 | 3.8054 | 6.44 |
| 10 | 23.5005 | 3.7823 | 2.11 |
| 11 | 24.3335 | 3.6547 | 30.61 |
| 12 | 5.6081 | 3.4756 | 59.60 |
| 13 | 26.2131 | 3.3967 | 4.11 |
| 14 | 27.1428 | 3.2825 | 33.84 |
| 15 | 28.0166 | 3.1820 | 72.40 |
| 16 | 29.1119 | 3.0648 | 46.93 |
| 17 | 29.6725 | 3.0081 | 9.41 |
| 18 | 30.7201 | 2.9079 | 53.85 |
| 19 | 31.4931 | 2.8383 | 6.89 |
| 20 | 32.0167 | 2.7930 | 6.09 |
| 21 | 33.7326 | 2.6548 | 48.62 |
| 22 | 34.1981 | 2.6197 | 20.24 |
| 23 | 35.8498 | 2.5027 | 12.73 |
| 24 | 38.3289 | 2.4708 | 11.49 |
| 25 | 37.0420 | 2.4248 | 16.14 |
| 26 | 37.8571 | 2.3745 | 5.29 |
| 27 | 39.1994 | 2.2963 | 7.34 |

EXAMPLE 2

The reactants of Example 1 were slurried in the amounts given in Example 1, homogenized, and reacted at 160° C. for 68 hours in an autoclave and filtered. The filtrate, after washing with distilled water and drying, was found to have the characteristic x-ray diffraction pattern given in Table IV and to have the chemical composition 0.99 $K_2O:Al_2O_3:4.96\ Si_{O2}$. It comprised euhedral prisms 0.1 by 0.3 micron.

EXAMPLE 3

A total of 36.7 g of metakaolin was blended with 91 g of potassium silicate, 13.2 g of KOH (85% $K_2O$) and 254 g of $H_2O$ to form a slurry having a composition in terms of mole ratios of oxides as follows:

| | |
|---|---|
| $K_2O:Al_2O_3$ | 1.4 |
| $SiO_2:Al_2O_3$ | 4.5 |
| $H_2O:Al_2O_3$ | 110 |

The slurry was then homogenized and reacted in an autoclave at 220° C. for 3 days. After reaction the slurry was filtered and the filtrate was washed, dried and analyzed. The product was pure and had an x-ray diffraction pattern shown in Table IV and a hexagonal unit cell with a=18.46 Å and c=7.56 Å. The chemical composition of the product was found to be:

0.99 $K_2O:Al_2O_3:4.36\ SiO_2$

EXAMPLE 4

A slurry having a composition described in Example 3 was autoclaved at 280° C. for 3 days, after which time it was quenched, filtered and washed. The crystalline product had an x-ray diffraction pattern as shown in Table IV and a chemical composition given by:

1.03 $K_2O:Al_2O_3:4.06\ SiO_2$

EXAMPLE 5

A total of 25.5 g of metakaolin was mixed in a blender with 11.4 g of KOH (85% $K_2O$), 50.75 g of potassium silicate and 185 g of $H_2O$ to form a slurry having a composition in terms of mole ratios of oxides as follows:

| | |
|---|---|
| $K_2O:Al_2O_3$ | 1.4 |
| $SiO_2:Al_2O_3$ | 4.0 |
| $H_2O:Al_2O_3$ | 110 |

After reacting the slurry in an autoclave for 3 days at 280° C., the slurry was filtered and the filtrate washed and dried. The product was pure and had an x-ray powder diffraction pattern as shown in Table IV and a hexagonal unit cell with a=18.49 Å and c=7.52 Å. The chemical composition of the product was found to be 0.98 $K_2O:Al_2O_3:3.76\ SiO_2$

EXAMPLE 6

A slurry having a composition in terms of mole ratios of oxides of:

| | |
|---|---|
| $K_2O:Al_2O_3$ | 1.4 |
| $SiO_2:Al_2O_3$ | 4.5 |
| $H_2O:Al_2O_3$ | 110 | was formed as follows: 26.4 g KOH (85% $K_2O$) were dissolved in 40 g $H_2O$. This solution was then added to 182 g potassium silicate (12.5% $K_2O$, 26.3% $SiO_2$), 468 g $H_2O$ and 73.4 g metakaolin in a blender. After homogenization this slurry was placed into small autoclaves and reacted at 220° C. After 3 days the product was 30% crystalline, and after 6 days it was 100% crystalline. Analysis of the 100% crystalline product after washing showed an x-ray diffraction pattern essentially as given in Table IV, and a chemical analysis of 10.7%

Al, 14.9% K and 23.7% Si, representing an oxide stoichiometry of: 0.96 K$_2$O:Al$_2$O$_3$:4.16 SiO$_2$.

EXAMPLE 7

A slurry having a composition in terms of mole ratios of oxides of:

| | |
|---|---|
| K$_2$O:Al$_2$O$_3$ | 1.2 |
| SiO$_2$:Al$_2$O$_3$ | 5.1 |
| H$_2$O:Al$_2$O$_3$ | 100 | was formed by combining, homogenizing and reacting together at 220° C. for 3 days the following amounts of ingredients:
  13.3 g KOH (85% K$_2$O)
  73.4 g metakaolin
  218 g potassium silicate
  431 g H$_2$O.

The product was highly crystalline, having an x-ray diffraction pattern identical to that given in Table IV. The chemical analysis yielded a composition of: 0.99 K$_2$O:Al$_2$O$_3$:4.78 SiO$_2$.

EXAMPLE 8

After the zeolite of Example 7 was dried at 400° C. for 1 hour, rehydrated at 35% relative humidity in a rehydrator and thermogravimetrically analyzed up to 400° C., it was found to have lost 10.2% by weight water. This water capacity of the zeolite is comparable to similar capacities reported for chabazites and mordenites by D. W. Breck, *Molecular Sieves*, (J. Wiley & Sons: 1973), p. 748. This indicates that the zeolite of this invention may be useful as a drying agent, particularly for highly acidic refinery and natural gas streams.

In summary, the present invention is seen to provide a novel crystalline zeolite, designated as ECR-2, which has a silica to alumina ratio lower than that of zeolite L. Also provided is a convenient process for preparing the zeolite resulting in nearly stoichiometric conversion of reactants to product.

I claim:

1. A synthetic crystalline zeolite characterized by having a composition, in terms of mole ratios of oxides in the range:

$$0.9 \text{ to } 1.1 \ M_{2/n}O:Al_2O_3:2.5 \text{ to } 4.8 \ SiO_2:xH_2O$$

wherein M represents at least one exchangeable cation of a metal selected from Group I through VIII of the Periodic Table, n represents the valence of M, and x may be 0 or a number from 1 to about 6, and characterized by having an x-ray powder diffraction pattern as given by Table IV.

2. The zeolite of claim 1 wherein M is a mono-, di- or trivalent metal cation selected from Group I, II or III of the Periodic Table.

* * * * *